US010964168B2

(12) United States Patent
Oyama et al.

(10) Patent No.: US 10,964,168 B2
(45) Date of Patent: Mar. 30, 2021

(54) INFORMATION PROCESSOR AND GAME PROGRAM

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/565,701

(22) Filed: Sep. 10, 2019

(65) Prior Publication Data

US 2020/0143637 A1 May 7, 2020

(30) Foreign Application Priority Data

Nov. 2, 2018 (JP) ............................ JP2018-207647

(51) Int. Cl.

*A63F 13/00* (2014.01)
*G07F 17/32* (2006.01)
*G07F 17/34* (2006.01)

(52) U.S. Cl.

CPC ...... *G07F 17/3267* (2013.01); *G07F 17/3213* (2013.01); *G07F 17/3244* (2013.01); *G07F 17/34* (2013.01)

(58) Field of Classification Search

CPC .. G07F 17/32; G07F 17/3267; G07F 17/3244; G07F 17/3258; G07F 17/34; G07F 17/3211; G07F 17/3213; G07F 17/3232; A63F 2300/6036

See application file for complete search history.

(56) References Cited

U.S. PATENT DOCUMENTS

| | | | | |
|---|---|---|---|---|
| 8,986,111 | B2 * | 3/2015 | Cuddy | G07F 17/32 463/27 |
| 10,475,287 | B1 * | 11/2019 | Daumling | G07F 17/3258 |
| 2004/0121833 | A1 * | 6/2004 | Mezen | G07F 17/3267 463/16 |
| 2005/0043082 | A1 * | 2/2005 | Peterson | G07F 17/32 463/20 |
| 2006/0068892 | A1 * | 3/2006 | Gomez | G07F 17/34 463/20 |
| 2006/0246979 | A1 * | 11/2006 | Chim | G07F 17/3267 463/13 |

(Continued)

FOREIGN PATENT DOCUMENTS

GB 2353128 A * 2/2001 ............ G07F 17/34

*Primary Examiner* — Justin L Myhr
(74) *Attorney, Agent, or Firm* — Lex IP Meister, PLLC

(57) ABSTRACT

An information processor and a program, with which a control program for providing various payout amounts as a result of random determination in a game is simplified, are provided. While a slot game is repeatedly executed, a payout amount awarded in response to the total points which is the sum total of the points corresponding to the number of "RED V" symbols rearranged in the symbol display area 21 and the points corresponding to the number of "BLUE V" symbols rearranged in the symbol display area 21 increases each time the "UP" symbol is rearranged in the symbol display area 21. As such, a payout amount which may be awarded is increased little by little, and hence various payout amounts are available.

11 Claims, 14 Drawing Sheets

(56) References Cited

U.S. PATENT DOCUMENTS

| | | | | |
|---|---|---|---|---|
| 2007/0202943 | A1* | 8/2007 | Thomas | G07F 17/32 463/27 |
| 2008/0261675 | A1* | 10/2008 | Fujimoto | G07F 17/3211 463/20 |
| 2009/0239642 | A1* | 9/2009 | Yoshizawa | G07F 17/3234 463/20 |
| 2011/0111826 | A1* | 5/2011 | Baerlocher | G07F 17/34 463/20 |
| 2016/0253873 | A1* | 9/2016 | Olive | G07F 17/3258 463/20 |

* cited by examiner

FIG.5

SYMBOL ARRAYS OF VIDEO REELS
(FOR NORMAL SYMBOL RANDOM DETERMINATION PROCESS)

| | REEL 1 | REEL 2 | REEL 3 |
|---|---|---|---|
| 0 | RED V | BAR | CHERRY |
| 1 | CHERRY | WATERMELON | BAR |
| 2 | 7 | RED V | WILD |
| 3 | WATERMELON | 7 | BLUE V |
| 4 | BAR | BELL | BELL |
| 5 | BELL | BLUE V | WATERMELON |
| 6 | BELL | BLUE V | WATERMELON |
| 7 | BELL | BELL | BELL |
| 8 | WATERMELON | WATERMELON | CHERRY |
| 9 | BLUE V | WATERMELON | BELL |
| 10 | BONUS | BONUS | WATERMELON |
| 11 | WATERMELON | CHERRY | BELL |
| 12 | BLUE V | BLUE V | BAR |
| 13 | BELL | CHERRY | RED V |
| 14 | BAR | RED V | 7 |
| 15 | CHERRY | BAR | BLUE V |
| 16 | RED V | WILD | 7 |
| 17 | BAR | BLUE V | CHERRY |
| 18 | BELL | CHERRY | BELL |
| 19 | BONUS | WATERMELON | WILD |
| 20 | BAR | BELL | CHERRY |
| 21 | CHERRY | BAR | BELL |
| 22 | WILD | CHERRY | CHERRY |
| 23 | BELL | CHERRY | WATERMELON |
| 24 | WATERMELON | BLUE V | BONUS |
| 25 | 7 | BONUS | CHERRY |
| 26 | | 7 | BELL |
| 27 | | BELL | RED V |
| 28 | | BELL | WATERMELON |
| 29 | | BELL | WATERMELON |
| 30 | | | WATERMELON |
| 31 | | | |
| 32 | | | |
| 33 | | | |
| 34 | | | |

FIG.6

SYMBOL ARRAYS OF VIDEO REELS
(FOR FG SYMBOL RANDOM DETERMINATION PROCESS)

| | REEL 1 | REEL 2 | REEL 3 |
|---|---|---|---|
| 0 | RED V | BAR | CHERRY |
| 1 | BLUE V | WATERMELON | BAR |
| 2 | 7 | RED V | WILD |
| 3 | WATERMELON | 7 | BLUE V |
| 4 | BAR | BELL | BELL |
| 5 | BELL | UP | WATERMELON |
| 6 | BELL | BLUE V | WATERMELON |
| 7 | BELL | BELL | BELL |
| 8 | WATERMELON | WATERMELON | CHERRY |
| 9 | BLUE V | WATERMELON | BELL |
| 10 | BONUS | BONUS | WATERMELON |
| 11 | WATERMELON | CHERRY | BELL |
| 12 | CHERRY | BLUE V | BAR |
| 13 | BELL | CHERRY | RED V |
| 14 | BAR | UP | 7 |
| 15 | CHERRY | BAR | BLUE V |
| 16 | RED V | WILD | 7 |
| 17 | BAR | BLUE V | CHERRY |
| 18 | BELL | CHERRY | BELL |
| 19 | BONUS | WATERMELON | WILD |
| 20 | BAR | BELL | CHERRY |
| 21 | CHERRY | CHERRY | BELL |
| 22 | WILD | CHERRY | CHERRY |
| 23 | BELL | CHERRY | WATERMELON |
| 24 | WATERMELON | UP | BONUS |
| 25 | 7 | BONUS | CHERRY |
| 26 | | 7 | BELL |
| 27 | | BELL | RED V |
| 28 | | BELL | |
| 29 | | BELL | |
| 30 | | | |
| 31 | | | |
| 32 | | | |
| 33 | | | |
| 34 | | | |

FIG.7

PAYOUT TABLE

| TYPE OF SYMBOL REARRANGED ON PAYLINE | PAYOUT |
|---|---|
| 「7」×3 | 120 |
| 「RED V」×3 | 100 |
| 「BLUE V」×3 | 70 |
| 「BAR」×3 | 50 |
| 「WATERMELON」×3 | 20 |
| 「BELL」×3 | 10 |
| 「CHERRY」×3 | 5 |
| 「BONUS」×3 | FREE GAME(8 GAMES) |

FIG.8

FG POINT PAYOUT TABLE
(INITIAL VALUE)

| | |
|---|---|
| 50p～ | 14400 |
| 40～49p | 6000 |
| 30～39p | 2400 |
| 20～29p | 1200 |
| 10～19p | 480 |
| 5～9p | 240 |
| RED V×5p<br>BLUE V×1p | |

INFORMATION PROCESSOR AND GAME PROGRAM

CROSS-REFERENCE TO RELATED APPLICATION

This application claims the benefit of Japanese Patent Application No. 2018-207647 filed on Nov. 2, 2018, which application is incorporated herein by reference in its entirety.

FIELD OF THE INVENTION

The present invention relates to an information processor and a game program.

BACKGROUND OF THE INVENTION

Social games have recently been provided. In such a social game, a game provided from a server (information processor) is played on terminal devices such as smartphones owned by many players, over a communication network.

In the social games, there is a slot game in which symbols to be rearranged are randomly determined (symbol random determination), the arrangement pattern of the symbols selected by the random determination is displayed on a display, and a payout is awarded in accordance with the displayed arrangement pattern of the symbols (see Patent Literature 1 (U.S. Pat. No. 8,684,816), Patent Literature 2 (Japanese Unexamined Patent Publication No. 2013-146608), and Patent Literature 3 (U.S. Pat. No. 9,747,756)). Various payout amounts are typically awarded in accordance with arrangement patterns of rearranged symbols in the slot game, and such various payout amounts are advantageous for players.

BRIEF SUMMARY OF THE INVENTION

However, when various payout amounts are available and corresponding various arrangement patterns of symbols are set, it is difficult for players to grasp all arrangement patterns of symbols. Furthermore, for a game designer (game provider), it is necessary to prepare various arrangement patterns of symbols corresponding to various payout amounts and to adjust probabilities of appearance of these arrangement patterns of symbols. This is highly likely to be troublesome in terms of the construction of the control program.

Under this circumstance, an object of the present invention is to provide an information processor and a program, with which a control program for providing various payout amounts as a result of random determination in a game is simplified.

The present invention relates to an information processor which is capable of executing a game in which symbol random determination is performed to select symbols to be rearranged and a payout is awarded in accordance with an arrangement pattern of the selected symbols, the information processor including:

a storage device configured to store a payout table in which the number of first symbols is associated with a payout amount; and a controller programmed to execute the processes of:

(a) when a first symbol is included in the arrangement pattern of the symbols selected by the symbol random determination while the game is repeated a predetermined number of times, cumulating the number of the first symbols;

(b) when a second symbol is included in the arrangement pattern of the symbols selected by the symbol random determination while the game is repeated the predetermined number of times, increasing the payout amount associated with the number of the first symbols in the payout table; and (c) awarding a payout calculated based on the number of the first symbols cumulated in the process (a) and the payout table in which the payout amount associated with the number of the first symbols is increased in the process (b).

Because a payout awarded in accordance with the number of the first symbols (cumulative value) increases each time second symbol is rearranged, a payout amount which may be awarded is increased little by little, and hence various payout amounts are available. On this account, when various payout amounts are provided for a payout awarded as a result of a game involving symbol random determination, it is unnecessary to prepare various combinations of symbols corresponding to various payout amounts and adjust the probabilities of appearance of arrangement patterns of the symbols, with the result that the control program can be easily constructed.

According to the present invention, the above-described information processor is arranged such that the payout table stores, as an initial value, the payout amount associated with the number of the first symbols, and in the process (b), each time it is determined that a second symbol is included in the arrangement pattern of the symbols selected by the symbol random determination, the payout amount associated with the number of the first symbols in the payout table is increased by adding the initial value to the payout amount.

According to the arrangement above, a process in which the payout awarded in accordance with the number of the first symbols (cumulative value) increases each time the second symbol is rearranged is realized only by adding each initial value to each payout amount associated with the number of first symbols in the payout table. This makes it possible to simplify the control program when various payout amounts are provided for a payout awarded as a result of a game involving symbol random determination.

The present invention may relate to a game program run on an information processor which is capable of executing a game in which symbol random determination is performed to select symbols to be rearranged and a payout is awarded in accordance with an arrangement pattern of the selected symbols.

When the game is executed, the game program causes the information processor to execute the processes of:

(a) when a first symbol is included in the arrangement pattern of the symbols selected by the symbol random determination while the game is repeated a predetermined number of times, cumulating the number of the first symbols;

(b) when a second symbol is included in the arrangement pattern of the symbols selected by the symbol random determination while the game is repeated the predetermined number of times, increasing a payout amount associated with the number of the first symbols in a payout table in which the number of the first symbols is associated with a payout amount; and (c) awarding a payout calculated based on the number of the first symbols cumulated in the process (a) and the payout table in which the payout amount associated with the number of the first symbols is increased in the process (b).

The present invention relates to an information processor which is capable of executing a game in which symbol random determination is performed to select symbols to be rearranged and a payout is awarded in accordance with an arrangement pattern of the selected symbols, the information processor including:

a storage device configured to store a payout table in which the number of first symbols is associated with a payout amount; and a controller programmed to execute the processes of:

(a) when a first symbol is included in the arrangement pattern of the symbols selected by the symbol random determination while the game is repeated a predetermined number of times, cumulating the number of the first symbols;

(b) when the arrangement pattern of the symbols selected by the symbol random determination satisfies a predetermined condition while the game is repeated the predetermined number of times, increasing the payout amount associated with the number of the first symbols in the payout table; and (c) awarding a payout calculated based on the number of the first symbols cumulated in the process (a) and the payout table in which the payout amount associated with the number of the first symbols is increased in the process (b).

In the present invention, the above-described information processor may be arranged such that, in the process (b), each time it is determined that a second symbol is included in the arrangement pattern of the symbols selected by the symbol random determination, the payout amount associated with the number of the first symbols in the payout table is increased by adding a predetermined value to the payout amount.

In the present invention, the above-described information processor may be arranged such that, in the process (b), each time it is determined that a second symbol is included in the arrangement pattern of the symbols selected by the symbol random determination, the payout amount associated with the number of the first symbols in the payout table is increased by multiplying the payout amount by a predetermined value.

The present invention elates to a non-volatile recording medium storing a game program, the game program being run on an information processor which executes a game in which symbol random determination is performed to select symbols to be rearranged and a payout is awarded in accordance with an arrangement pattern of the selected symbols, when the game is executed, the game program causing the information processor to execute the processes of:

(a) when a first symbol is included in the arrangement pattern of the symbols selected by the symbol random determination while the game is repeated a predetermined number of times, cumulating the number of the first symbols;

(b) when a second symbol is included in the arrangement pattern of the symbols selected by the symbol random determination while the game is repeated the predetermined number of times, increasing a payout amount associated with the number of the first symbols in a payout table in which the number of the first symbols is associated with a payout amount; and (c) awarding a payout calculated based on the number of the first symbols cumulated in the process (a) and the payout table in which the payout amount associated with the number of the first symbols is increased in the process (b).

An information processor and a program, with which a control program for providing various payout amounts as a result of random determination in a game is simplified, can be provided.

BRIEF DESCRIPTION OF THE DRAWINGS

FIG. 5 illustrates symbol arrays (for normal symbol random determination process) on video reels of the slot game.

FIG. 6 illustrates symbol arrays (for FG symbol random determination process) on video reels of the slot game.

FIG. 7 illustrates a payout table of the slot game.

FIG. 8 illustrates an FG point payout table.

DETAILED DESCRIPTION OF THE PREFERRED EMBODIMENT

Embodiment

An information processor of the present embodiment will be described with reference to figures.

Figure 1:
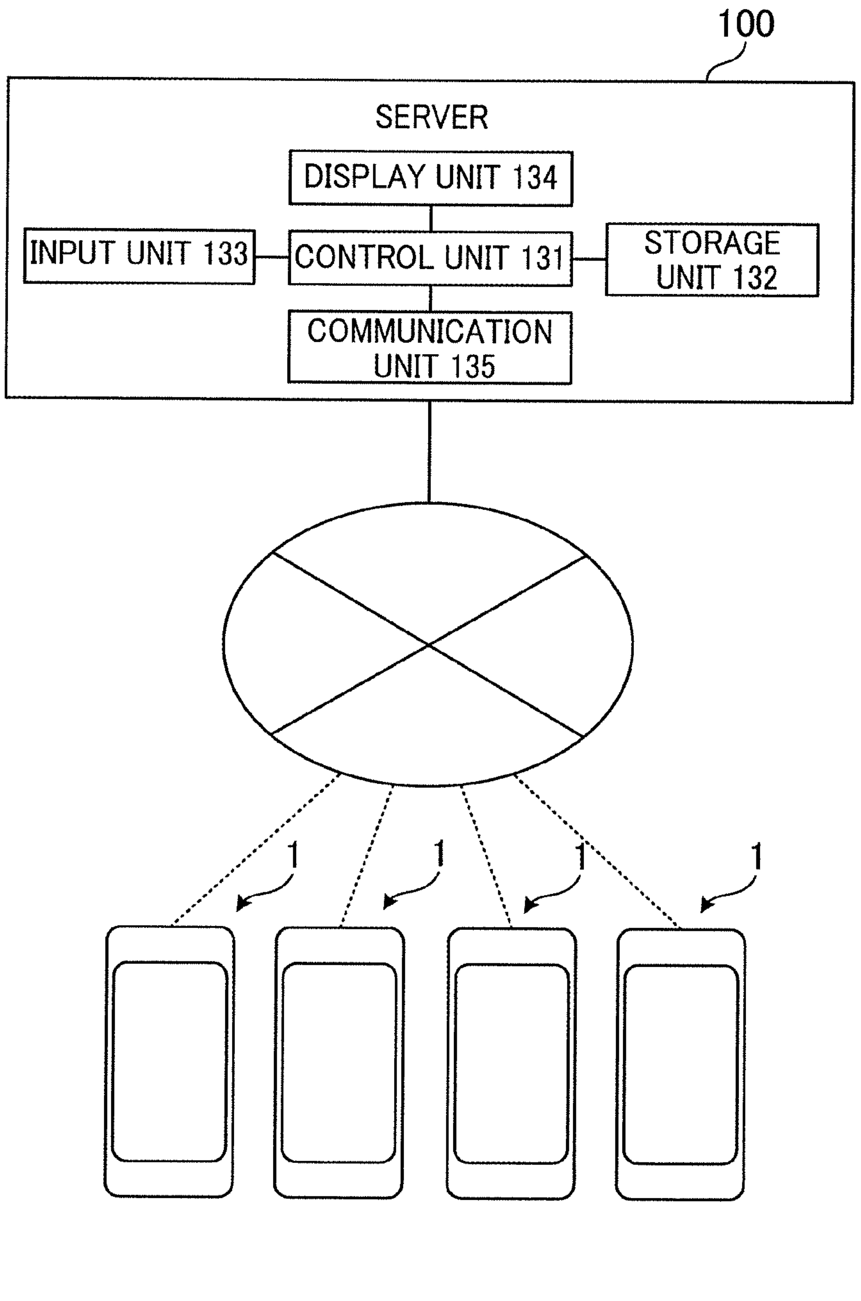
FIG. 1 illustrates a network environment between a server and a smartphone.

As shown in FIG. 1, a slot game (unit game) of the present embodiment is embodied as a social game which is executed through exchange of game data between a server 100 (information processor) and each smartphone 1, etc. over the Internet (communication line). To be more specific, game software of the slot game is run on a web browser provided by the server 100. As a result of player's access to the web browser provided by the server 100 through a terminal device such as a smartphone 1 and a PC, the slot game is run.

Figure 2:
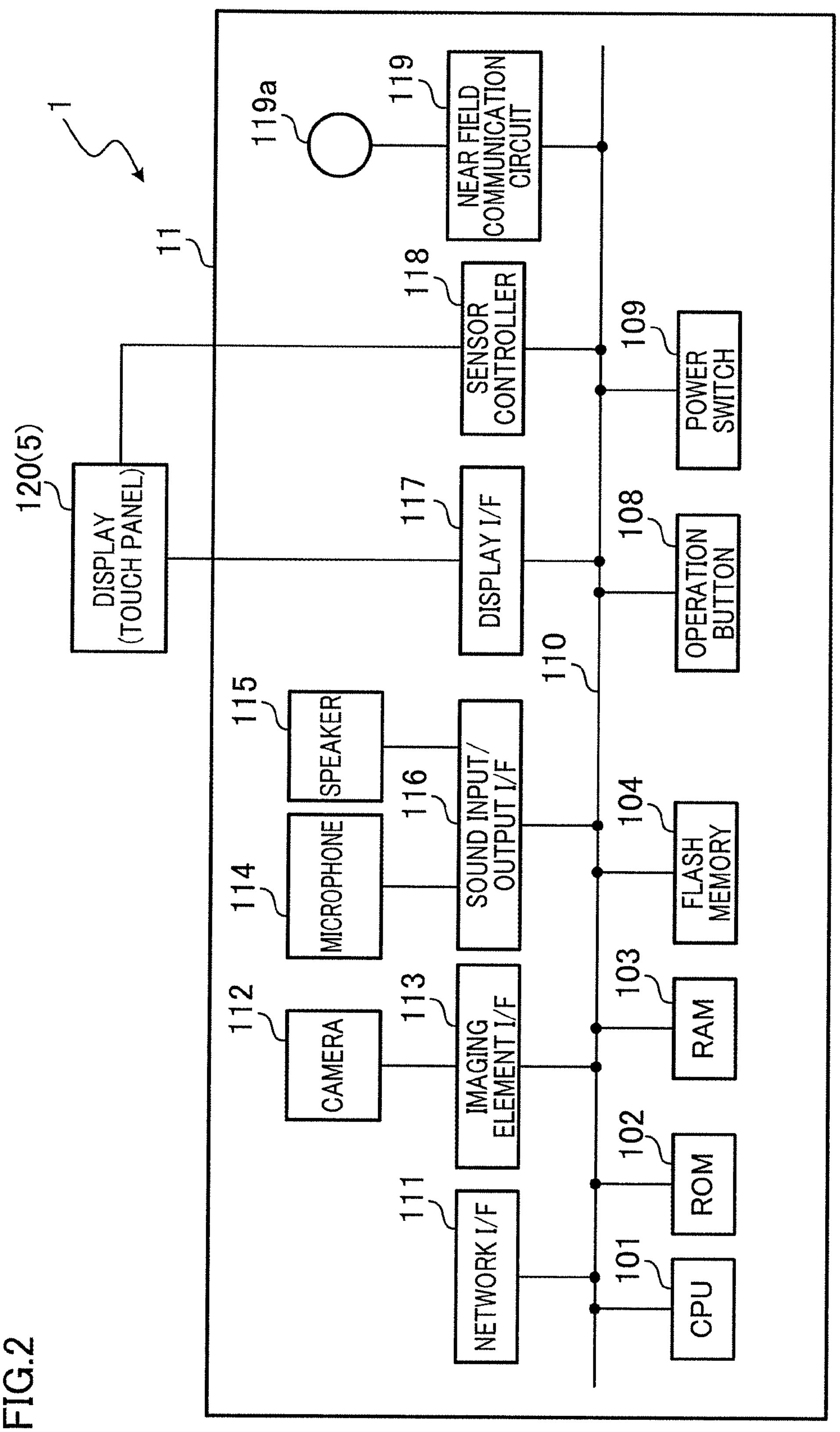
FIG. 2 is a block diagram of the electrical configuration of the smartphone.

In the present embodiment, the server 100 shown in FIG. 1 is taken as an example of the information processor, and the smartphone 1 shown in FIG. 2 is taken as an example of the terminal device. In the present embodiment, part of or all of the processes executed by the server 100 may be executed by the smartphone 1. In such a case, a combination of the server 100 and the smartphone 1 is regarded as an information processor which is integrally controlled. The processes and actions of the server 100 and the smartphone 1 can be interpreted as those of a program, a game control method, or a system realized between the server 100 and the smartphone 1.

(Online)

The slot game of the present embodiment is run as an online game. To be more specific, as shown in FIG. 1, the server 100 managed by an administration organization of the slot game is connected to smartphones 1 of many players over the Internet.

In this way, the slot game is run online. As a result of player's access to the web browser provided by the server 100 through an information device such as a smartphone 1 and a PC, the slot game can be run. The server 100 is configured to exchange credits (which can be bought by cash, a credit card, electronic money, a prepaid card, etc.)

owned by players to coins (gaming media) which are electronic information usable in the slot game, and to manage the coins owned by the players.

(Structure of Server 100)

As shown in FIG. 1, the server 100 is an information processor which is used by an administrator of the slot game, etc. to manage and control a social game service. As the server 100 receives a request or game data from a smartphone 1 operated by a player, the server 100 sends a game program, a web browser, game data, etc. which can be run on the smartphone 1. The server 100 of the present embodiment includes a control unit 131, a storage unit 132, an input unit 133, a display unit 134, and a communication unit 135.

The control unit 131 (e.g., a CPU, equivalent to a controller) is configured to control the server 100. Furthermore, data is sent and received between the control unit 131, the storage unit 132, the input unit 133, the display unit 134, and the communication unit 135.

The storage unit 132 is constituted by a ROM (Read Only Memory) storing a system program, a RAM (Random Access Memory) which is a rewritable storage area, a flash memory, etc.

The input unit 133 is a device allowing the administrator or the like to input setting or the like of the slot game, and is embodied by a keyboard and a mouse, for example.

The display unit 134 is configured to display an operation screen for the administrator, in response to an instruction from the control unit 131.

The communication unit 135 is provided to communicate with the smartphones 1.

(Structure of Smartphone 1)

As shown in FIG. 2, the smartphone 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119*a* of the near field communication circuit 119. In the front surface of the housing 11, a display 120 with a touch panel 5 (input unit) is embedded.

The display 120 is configured to be able to display images. The display method of the display 120 is, for example, liquid crystal, organic electroluminescence, CRT (Cathode Ray Tube), or plasma.

The CPU (Central Processing Unit) 101 controls the entire smartphone 1. The ROM (Read Only Memory) 102 stores programs used for driving the CPU 101, such as an IPL (Initial Program Loader).

The RAM (Random Access Memory) 103 is used as a work area of the CPU 101. The flash memory 104 stores application software (program) for running the game of the present embodiment, a communication program, and data such as image data and sound data. The operation button 108 is used for, for example, initial setting of the smartphone 1. The power switch 109 is used for turning on/off the power source of the smartphone 1.

The network I/F (Interface) 111 is an interface for performing data communication with the server 100, etc., by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 120 under the control of the CPU 101. The sensor controller 118 is a circuit for receiving an input from the touch panel 5 of the display 120. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

(Outline of Slot Game Executed by Server)

Figure 3:
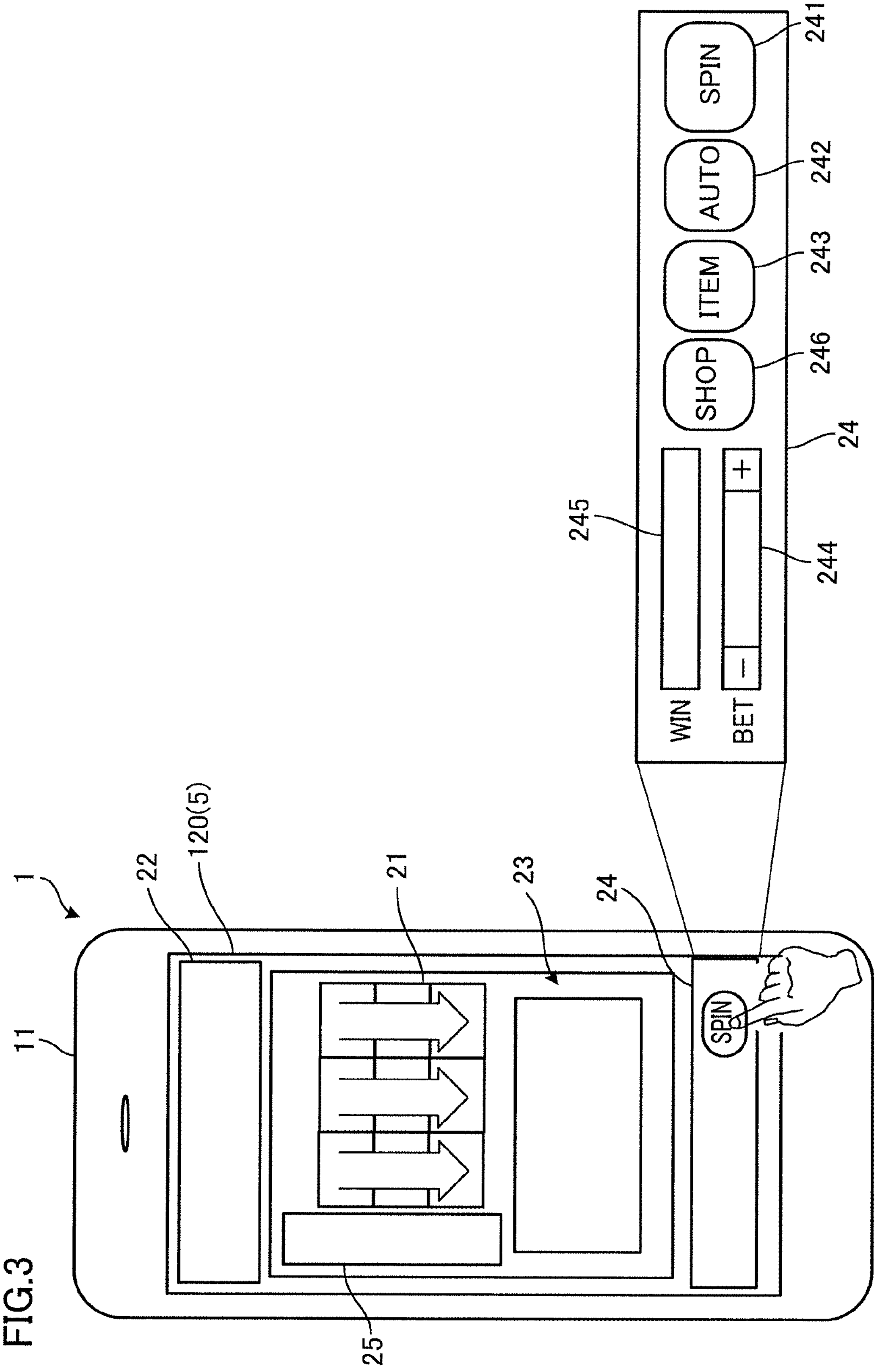
FIG. 3 shows a display state of a slot game on the smartphone.

When a request is sent from the smartphone 1 to the server 100, effect images, videos, etc. of the slot game are displayed by a web browser on the display 120 of the smartphone 1. Thereafter, the slot game starts upon selection of a selection image indicating the start of the slot game on the touch panel 5. For example, as shown in FIG. 3, when the slot game starts, the slot game in which symbols are rearranged in a symbol display area 21 which is formed of 9 areas forming a matrix with 3 columns and 3 rows becomes executable.

Plural types of slot games may be executable, and the rule, the state of payout, and effect images may be different depending on which slot game is executed. For example, in a slot game of one type, symbols are rearranged in a symbol display area formed of 20 areas forming a matrix with 5 columns and 4 rows.

The slot game of the present embodiment is basically started in response to the consumption of a predetermined amount of coins (gaming media) owned by a player. When a predetermined condition is satisfied, the player is able to start the slot game without the consumption of coins. (The predetermined condition is, for example, a condition of awarding a free game or the slot game is playable without the consumption of coins for a predetermined number of times in a day.)

The coins owned by players are electronic information. A player accesses the server 100 via the smartphone 1 and exchanges credits to coins in accordance with a payment method specified by the management organization of the slot game. The coins owned by players are used in various ways. For example, the coins are consumed to obtain an effect influencing on the slot game (as purchase of items), or consumed to change the appearance of an avatar of a player.

The number of coins owned by each player, which is managed by the server 100, is shared between the server 100 and each smartphone 1.

The gaming medium is not limited to any particular type, and may be electronic money or a game point not including valuable information.

(Slot Game: Definitions)

The slot game executed in the present embodiment is, as shown in FIG. 3, a game in which symbols are varied in the symbol display area 21 (scrolling image of reels) and then stopped (rearranged), and a benefit (e.g., a payout or an item advantageous for the player) is awarded based on the combination of the symbols (arrangement pattern of the symbols) displayed in the symbol display area 21. A state in which symbols are displayed after being varied and stopped in the symbol display area 21 is termed “rearrangement”.

A payout awarded based on a combination of symbols displayed in the symbol display area 21 is awarding of coins.

The “unit game” is a series of operations from the start of the receiving of a bet to the establishment of a prize (i.e., a combination of symbols satisfies a predetermined relation). To put it differently, the unit game includes a single bet time for receiving a bet, a single game time of rearranging symbols, and a single payout time of a payout process of awarding a payout.

(Slot Game Screen)

A slot game screen displayed on the display 120 of the smartphone 1 will be described.

As shown in FIG. 3, when the slot game is executed, the slot game screen is displayed on the display 120. The slot game screen displays a symbol display area 21 formed of 9 areas forming a matrix with 3 columns and 3 rows, a game information display area 22 on which information of increment and decrement in accordance with the execution of the slot game (e.g., the number of currently-owned coins) is displayed, an effect display area 23 on which moving and still images and messages related to the game are displayed in accordance with the progress of the slot game, an operation display area 24 which is operated by the player to progress the slot game, and a payout table display area 25 on which information such as a payout table is displayed. The operation display area 24 includes a spin button 241, an AUTO button 242, an ITEM button 243, a bet button 244, a WIN display portion 245, and a shop button 246.

The touch panel 5 of the display 120 makes it possible to detect the coordinates of a part touched by a player's finger or the like. With this arrangement, for example, the slot game (unit game) is executed once, upon a touch input of the image of the spin button 241. Furthermore, the slot game is serially executed plural times as the image of the AUTO button 242 is pressed. When the image of the ITEM button 243 is pressed, the player is able to select and use a previously-obtained item (which exerts an influence in the slot game). When the image of the shop button 246 is touched, the smartphone 1 accesses the server 100 and the player enters a shop in which credits (which can be bought by cash, a credit card, electronic money, a prepaid card, etc. owned by the player) are exchangeable with coins, or credits or coins are exchangeable with an item.

(Paylines)

In the symbol display area 21, three video reels on which symbols are provided (see FIG. 5) are scrolled, and are rearranged after a predetermined time elapses. As a result, parts of each video reel (three successive symbols in the present embodiment) are displayed for the player. In the symbol display area 21, a symbol is displayed in each of the areas in the upper stage, the middle stage, and the lower stage, in each video reel. To put it differently, 9 symbols are displayed in 9 areas with 3 by 3 matrix in the symbol display area 21 (see FIG. 12).

Figure 4:
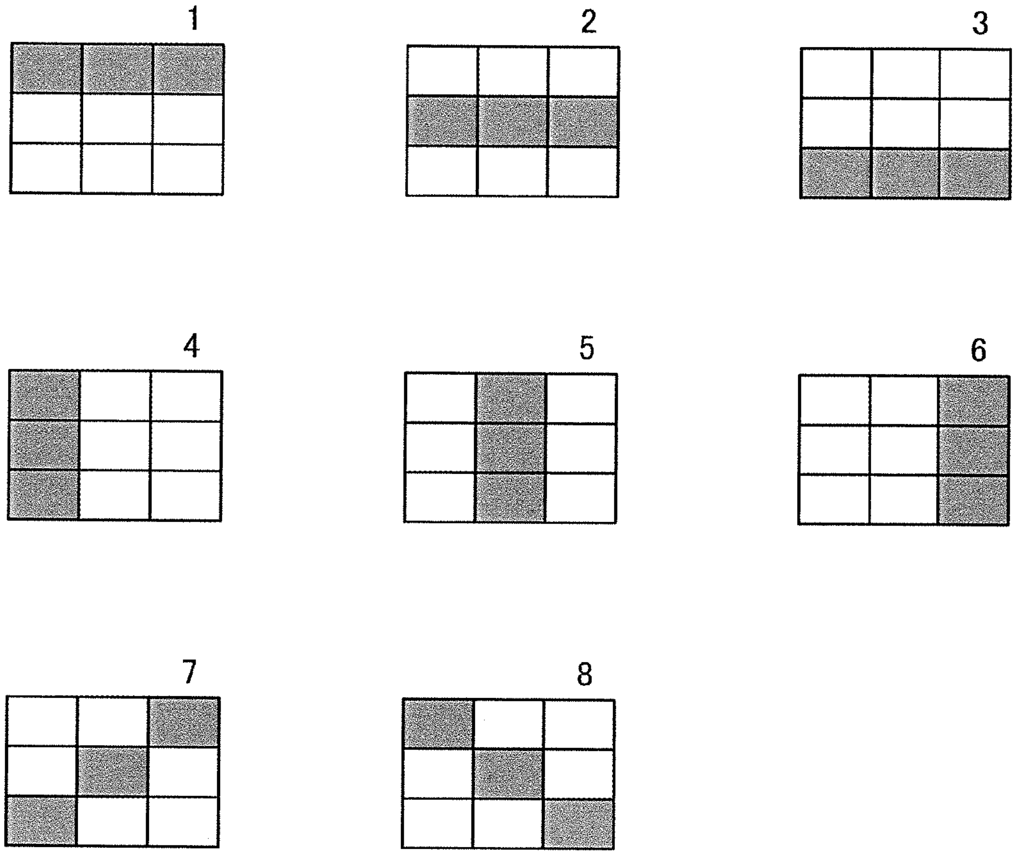
FIG. 4 shows paylines of the slot game.

In the present embodiment, a line connecting three of nine areas of the symbol display area 21 is regarded as a payline (see FIG. 4). When three symbols of the same type are successively rearranged on the payline, a win is achieved (a payout is awarded) (see FIG. 7). In regard to the number of the paylines, while there are 9 paylines in the present embodiment as shown in FIG. 4, the number of the paylines may be determined at will.

(Symbol Arrays of Video Reels Used in Normal Symbol Random Determination Process)

With reference to FIG. 5, symbol arrays on video reels used in a later-described normal symbol random determination process will be described. Furthermore, with reference to FIG. 6, symbol arrays on video reels used in a later-described FG symbol random determination process will be described.

As shown in FIG. 5, symbol arrays of video reels used in the normal symbol random determination process are arranged such that, to each of "REEL1", "REEL2", and "REEL3" of video reels 3, a symbol array formed of symbols corresponding to code numbers 0 to 30 is allocated. The types of the symbols arranged on the symbol arrays of the video reels include normal symbols such as "7", "RED V" (equivalent to first symbol), "BLUE V" (equivalent to first symbol), "BAR", "WATERMELON", "BELL", and "CHERRY", a "BONUS" symbol with which BONUS triggering the awarding of a free game is won, and a "WILD" symbol which is an almighty symbol that can substitute for any other symbol. The BONUS is won when three BONUS symbols are rearranged (see FIG. 12) on a payline 1 (see FIG. 4).

(Symbol Arrays of Video Reels Used in FG Symbol Random Determination Process)

With reference to FIG. 6, symbol arrays on video reels used in a later-described FG symbol random determination process will be described.

As shown in FIG. 6, on symbol arrays of video reels used in the FG symbol random determination process, an "UP" symbol (equivalent to second symbol) is arranged in addition to the symbols arranged on the symbol arrays of the video reels used in the normal symbol random determination process. As detailed later, in the free game process, whether a win (payout) is achieved is determined based on a combination of three symbols rearranged on a payline. In the free game process, furthermore, a point is awarded in accordance with the number of "RED V" symbols and the number of "BLUE V" symbols rearranged in at least one of the 9 areas of the symbol display area 21. To be more specific, 5 points are awarded for each "RED V" symbol, whereas 1 point is awarded for each "BLUE V" symbol. A payout corresponding to the total points awarded while the free game is executed eight times is awarded. As detailed later. when the "UP" symbol is rearranged in the symbol display area 21 while the free game is executed eight times, the payout corresponding to the total points awarded is increased. In the present embodiment, each time the "UP" symbol is rearranged in the symbol display area 21 while the free game is executed eight times, an initial value in an FG point table shown in FIG. 8 is added to the payout corresponding to the total points awarded.

(Payout Table)

The following describes a payout table with reference to FIG. 7.

The payout table defines a number of coins (payout amount) paid out as a result of a win which is determined based on a combination of three symbols rearranged on a payline. In the slot game, scroll of three video reels is stopped, and a win is achieved when three symbols of the same type are successively rearranged on a payline which is a target of result determination, in the symbol display area 21 (see FIG. 7). In accordance with the win, a predetermined payout is given to the player. For example, when three "7" symbols are rearranged on one payline as shown in FIG. 7, a win is achieved with "7" and 120 coins are awarded. A payout amount defined in the payout table shown in FIG. 7 is a payout amount when the number of betted coins is 1.

(FG Point Payout Table)

Referring to FIG. 8, the following will describe the FG point payout table (which is equivalent to a payout table in which the number of first symbols is associated with a payout amount). The FG point payout table is stored in the RAM 103.

In the free game process of the present embodiment, as described above, a point is awarded in accordance with the number of "RED V" symbols and the number of "BLUE V" symbols rearranged in at least one of the 9 areas of the symbol display area 21. To be more specific, 5 points are awarded for each "RED V" symbol, whereas 1 point is awarded for each "BLUE V" symbol. In the FG point payout table, a payout amount corresponding to the total points awarded while the free game is executed eight times is stored as an initial value. To be more specific, when the total points awarded while the free game is executed eight times are "5 to 9" points, 240 coins are awarded. When the total points awarded while the free game is executed eight times are "10 to 19" points, 480 coins are awarded. When the total points awarded while the free game is executed eight times are "20 to 29" points, 1200 coins are awarded. When the total points awarded while the free game is executed eight times are "30 to 39" points, 2400 coins are awarded. When the total points awarded while the free game is executed eight times are "40 to 49" points, 6000 coins are awarded. When the total points awarded while the free game is executed eight times are "50 or more" points, 14400 coins are awarded.

In the present embodiment, each time the "UP" symbol is rearranged in the symbol display area 21 while the free game is executed eight times, the initial value is added to the payout amount corresponding to each of the total points in the FG point table.

[Contents of Program]

Figure 9:
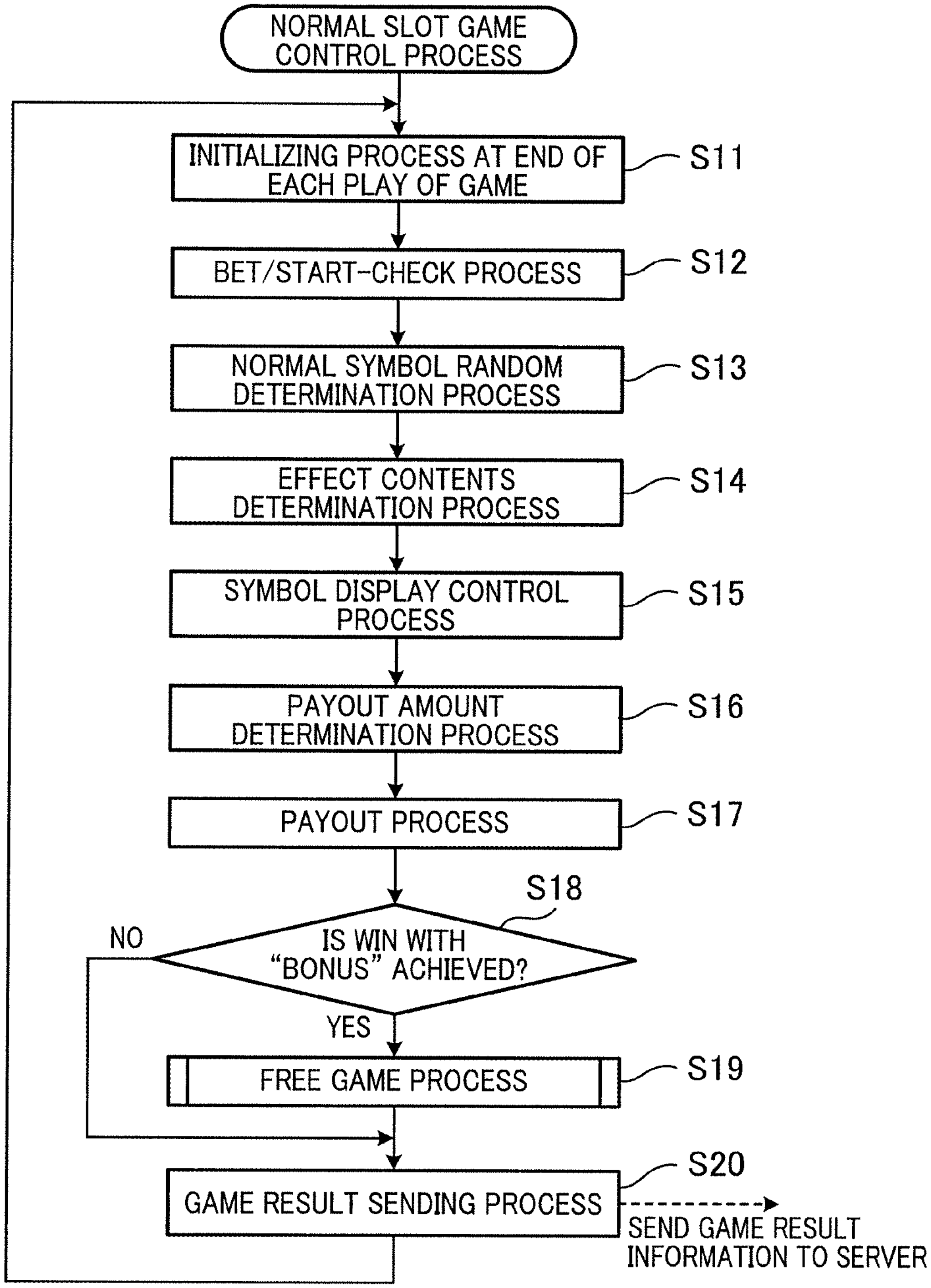
FIG. 9 shows a flowchart of a normal slot game control process.

The program of the slot game executed between the smartphone 1 and the server 100 will be described with reference to FIG. 9 to FIG. 11.

(Normal Slot Game Control Process)

The normal slot game control process executed by the smartphone 1 will be described with reference to FIG. 9.

To begin with, the CPU 101 executes an initializing process at the end of each play of the game, in order to start the slot game (S11). For example, this process clears data in a working area of the RAM 103, which becomes unnecessary at the end of each play of the unit game, e.g., a payline activated in the previous execution of the unit game, the value of a bet amount counter in a bet amount storage area, and symbols to be displayed on the symbol display area 21 as a result of random determination.

The CPU 101 then executes a bet/start-check process (S12). All (9) paylines are activated in this bet/start-check process. By a touch input such as pressing of a "+" button and a "−" button (see FIG. 3) of the bet button 244 of the operation display area 24 of the display 120 of the smartphone 1, the number of betted coins is determined. The number of betted coins is stored in a bet amount counter of the RAM 103. The activated paylines and the number of betted coins are determined in this way. As a result, when a win is achieved in the slot game, a payout awarded for the win equals to a value calculated by multiplying a payout corresponding to the win achieved on the activated payline (see FIG. 7) by the number of betted coins. In the bet/start-check process, furthermore, the CPU 101 determines whether a touch input has been made to the spin button 241. When a touch input has been made to the spin button 241, the slot game progresses as the routine proceeds to S13.

Subsequently, the CPU 101 executes the normal symbol random determination process (S13). In this process, by using the video reels shown in FIG. 5, to-be-stopped symbols are randomly selected from symbols provided on the video reels (REEL1, REEL2, and REEL3). The to-be-stopped symbols are data of 3 symbols to be displayed in the middle stage of each column of the symbol display area 21, out of the symbols forming each video reel. In this way, 9 symbols displayed in the symbol display area 21 are determined.

For example, in case of REEL1 of the video reels, when a code number "19" is randomly selected from 26 symbols (code numbers "0" to "25"), the "BONUS" symbol corresponding to the code number "19" is selected as the to-be-stopped symbol. In case of the REEL2, when a code number "25" is randomly selected from 30 symbols (code numbers "0" to "29"), the "BONUS" symbol corresponding to the code number "25" is selected as the to-be-stopped symbol. In case of the REEL3, when a code number "24" is randomly selected from 31 symbols (code numbers "0" to "30"), the "BONUS" symbol corresponding to the code number "24" is selected as the to-be-stopped symbol.

The CPU 101 then stores the determined three to-be-stopped symbols in a symbol storing area in the RAM 103.

Subsequently, the CPU 101 executes an effect contents determination process (S14). The CPU 101 samples an effect-use random number and randomly selects any of a plurality of predetermined effect contents.

Figure 12:
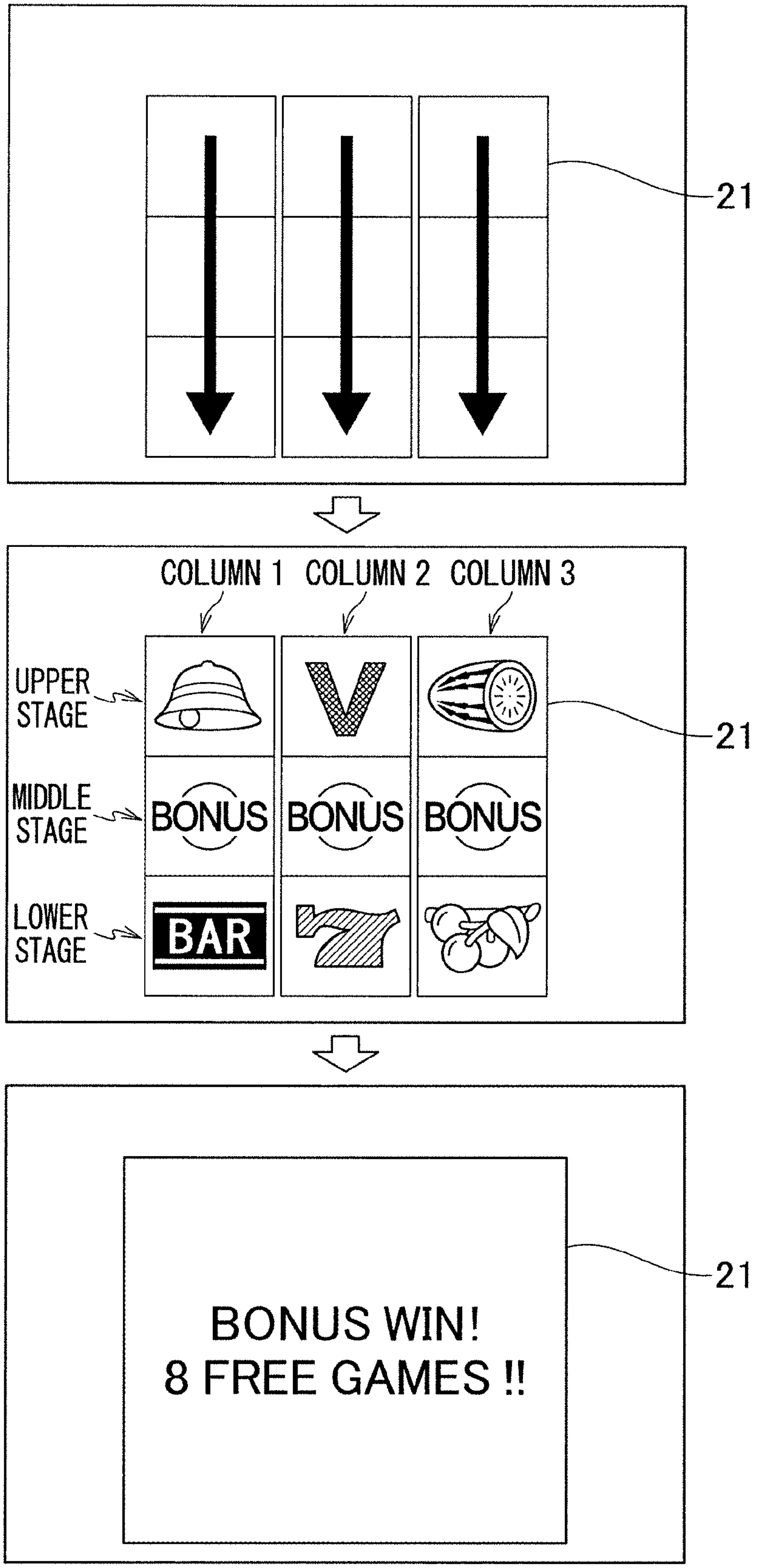
FIG. 12 illustrates a display screen of the slot game displayed on a smartphone.

Then, the CPU 101 executes a symbol display control process (S15). In this symbol display control process, as shown in FIG. 12, the scroll of the symbol arrays (REEL1, REEL2, and REEL3) of the video reels starts. After a predetermined time elapses, the three to-be-stopped symbols selected in the symbol random determination process in S13 are rearranged one by one in the middle stages of the column 1 to the column 3 of the symbol display area 21. In other words, 9 symbols including the to-be-stopped symbols are rearranged in the symbol display area 21. For example, as described above, when the "BONUS" symbol is selected as a to-be-stopped symbol in the REEL1, the "BONUS" symbol is selected as a to-be-stopped symbol in the REEL2, and the "BONUS" symbol is selected as a to-be-stopped symbol in the REEL3, the symbols "BONUS", "BONUS", and "BONUS" are provided in the middle stages of the column 1 to column 3 of the symbol display area 21 (see FIG. 12). In the upper and lower stages of each of the column 1 to the column 3 of the symbol display area 21, symbols having code numbers each of which is one number off the to-be-stopped symbols are rearranged (see FIG. 12).

Subsequently, the CPU 101 executes a payout amount determination process (S16). In this process, whether three symbols of the same type are successively rearranged on a payline and a win is achieved is determined based on the payout table (see FIG. 7) which is stored in the RAM 103. In accordance with the type of win, a payout is awarded. The payout awarded is stored in a payout amount storage area which is provided in the RAM 103.

For example, when three "7" symbols are rearranged on the payline 1 (see FIG. 4) and a win is achieved with "7", the payout table shown in FIG. 7 is referred to, and the payout is determined to be 120 coins (when the number of betted coins is 1) and the determined payout is stored in the payout amount storage area of the RAM 103.

Subsequently, the CPU 101 executes a payout process (S17). The CPU 101 adds a value stored in the payout amount storage area of the RAM 103 to the value of the coin counter provided in the RAM 103. For example, when "120" is stored in the payout amount storage area in the payout amount determination process in S16, "120" is added to the value of the coin counter.

Subsequently, the CPU 101 determines whether three BONUS symbols are rearranged (see FIG. 12) on a payline 1 (see FIG. 4) and "BONUS" is won (see FIG. 12) (S18). When the "BONUS" win is achieved (YES in S18), the routine proceeds to the free game process (S19). As detailed later, the free game process allows the player to play the slot game eight times without the consumption of coins.

Meanwhile, when the "BONUS" win is not achieved (NO in S18) or after S19, the CPU 101 executes a game result sending process (S20). In this game result sending process, results of the execution of the slot game once (unit game) are sent to the server 100 as game result information. The results are, for example, the number of coins betted in S12 (the value of the bet counter in the RAM 103), the to-be-stopped symbols determined in the normal symbol random determination process in S13 (i.e., 9 symbols displayed in the symbol display area 21), the type of a win achieved in the payout amount determination process in S17 (including a failure), and the value of the coin counter updated in the payout process (i.e., the number of coins owned). After S20, the routine goes back to S11.

(Free Game Process)

Figure 10:
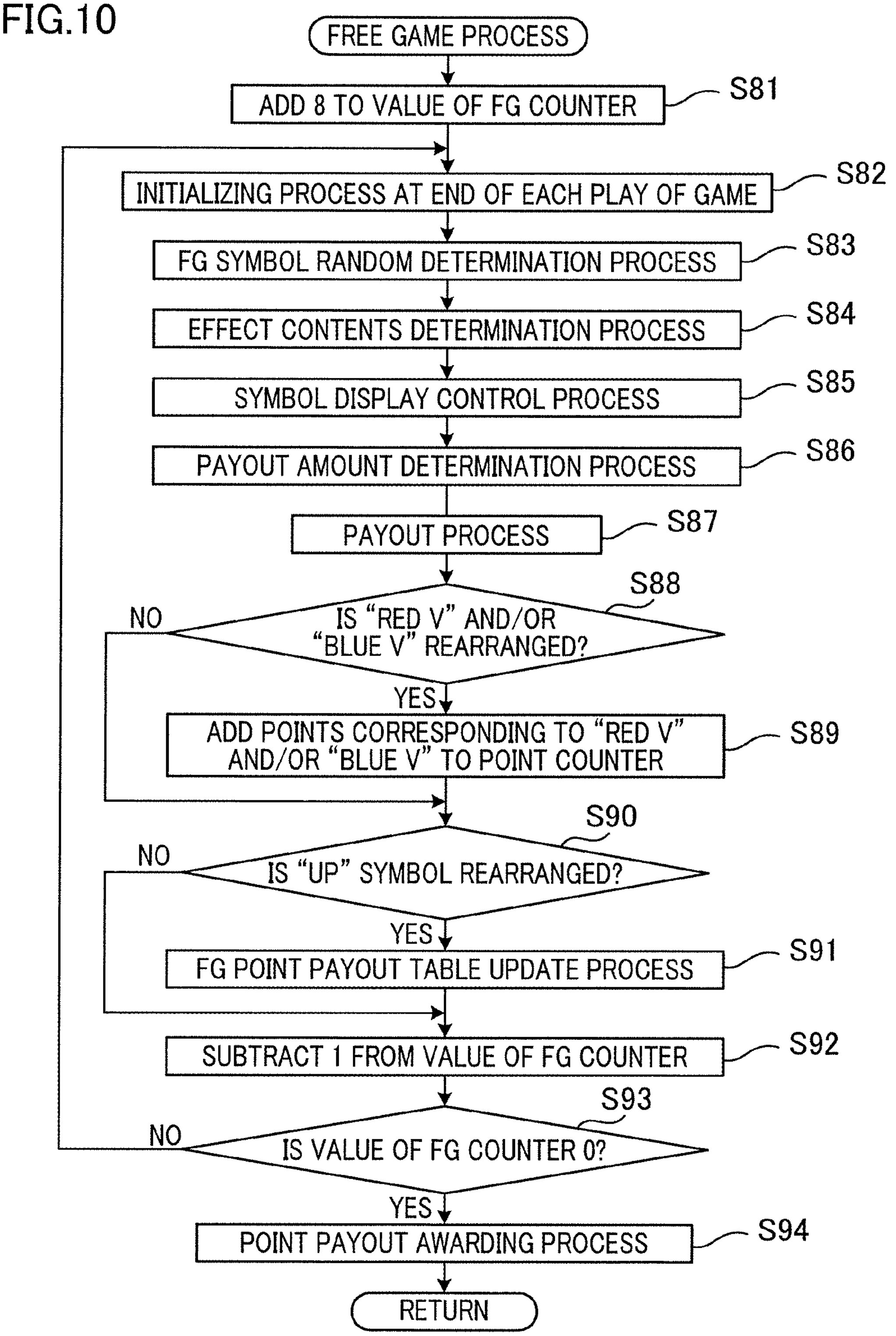
FIG. 10 is a flowchart of a free game process.

The following describes a free game process with reference to FIG. 10. This free game process is executed when it is determined in the normal slot game control process in S18 that the "BONUS" is won.

Figure 13:
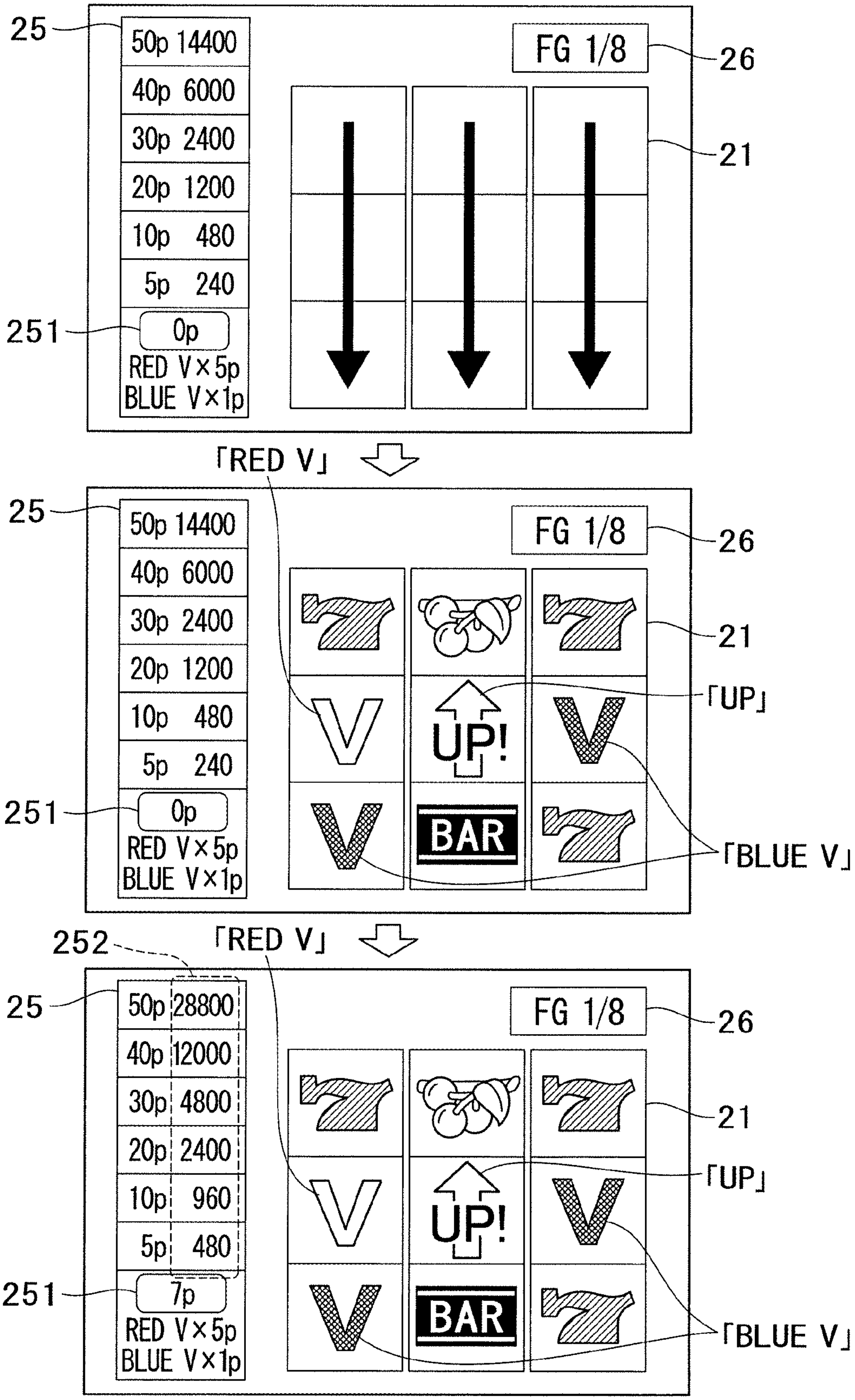
FIG. 13 illustrates a display screen of the slot game displayed on the smartphone.
Figure 14:
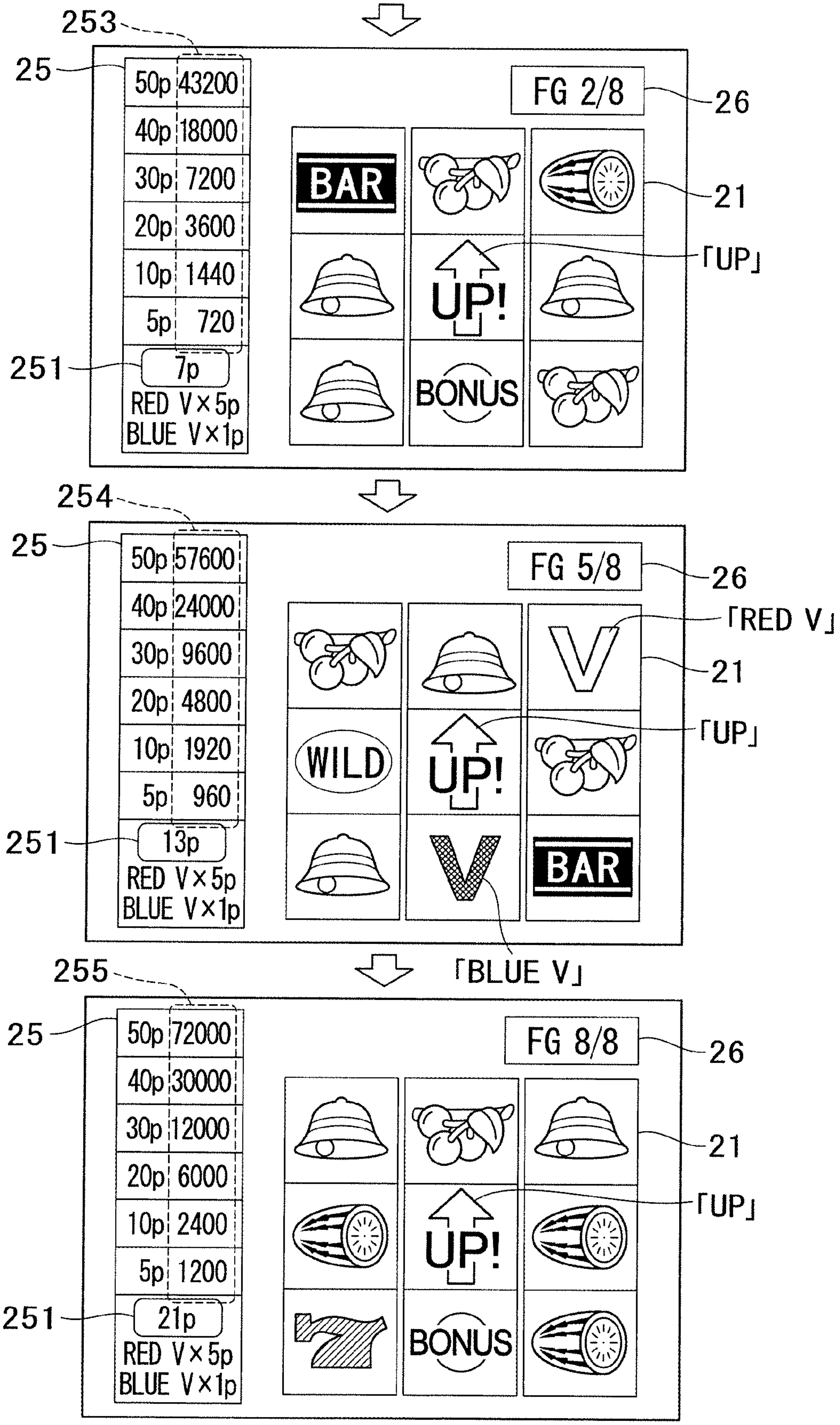
FIG. 14 illustrates a display screen of the slot game displayed on the smartphone.

To begin with, the CPU 101 adds "8" to the value of an FG counter of the RAM 103 (S81). At this stage, as shown in FIG. 13, a number indicating how many times, including the current execution, the free game has been executed is displayed in an FG number display area 26 on the display 120. For example, when the free game which is to be executed eight times is being executed first time, the FG number display area 26 displays "1/8" as shown in FIG. 13. When the free game which is to be executed eight times is being executed eighth time, the FG number display area 26 displays "8/8" as shown in FIG. 14.

Subsequently, in the same manner as in S11, the CPU 101 executes an initializing process at the end of each play of the game, in order to start the slot game (S82).

In the free game process, the (9) paylines activated in the normal slot game and the number of betted coins in the normal slot game remain the same. The CPU 101 determines whether a touch input has been made to the spin button 241. When a touch input has been made to the spin button 241, the slot game progresses as the routine proceeds to S83.

The CPU 101 then executes an FG symbol random determination process (S83). In this FG symbol random determination process, by using the video reels (for FG symbol random determination process) shown in FIG. 6, to-be-stopped symbols are randomly selected from symbols provided on the video reels (REEL1, REEL2, and REEL3). The to-be-stopped symbols are data of 3 symbols to be displayed in the middle stage of each column of the symbol display area 21, out of the symbols forming each video reel. In this way, 9 symbols displayed in the symbol display area 21 are determined.

For example, in case of REEL1 of the video reels, when a code number "0" is randomly selected from 26 symbols (code numbers "0" to "25"), the "RED V" symbol corresponding to the code number "0" is selected as the to-be-stopped symbol. In case of the REEL2, when a code number "14" is randomly selected from 30 symbols (code numbers "0" to "29"), the "UP" symbol corresponding to the code number "14" is selected as the to-be-stopped symbol. In case of the REEL3, when a code number "15" is randomly selected from 28 symbols (code numbers "0" to "27"), the "BLUE V" symbol corresponding to the code number "15" is selected as the to-be-stopped symbol.

The CPU 101 then stores the determined three to-be-stopped symbols in a symbol storing area in the RAM 103.

Subsequently, the CPU 101 executes an effect contents determination process as in S14 (S84). The CPU 101 samples an effect-use random number and randomly selects any of a plurality of predetermined effect contents.

The CPU 101 then executes a symbol display control process based on the to-be-stopped symbols stored in the symbol storing area (S85). In this symbol display control process, as shown in FIG. 13, the scroll of the symbol arrays (REEL1, REEL2, and REEL3) of the video reels starts. After a predetermined time elapses, the three to-be-stopped symbols selected in the FG symbol random determination process in S83 are rearranged one by one in the middle stages of the column 1 to the column 3 of the symbol display area 21. In other words, 9 symbols including the to-be-stopped symbols are rearranged in the symbol display area 21. For example, as described above, when the "RED V" symbol is selected as a to-be-stopped symbol in the REEL1, the "UP" symbol is selected as a to-be-stopped symbol in the REEL2, and the "BLUE V" symbol is selected as a to-be-stopped symbol in the REEL3, the symbols "RED V", "UP", and "BLUE V" are rearranged in the middle stages of the column 1 to column 3 of the symbol display area 21 (see FIG. 13). In the upper and lower stages of each of the column 1 to the column 3 of the symbol display area 21, symbols having code numbers each of which is one number off the to-be-stopped symbols are rearranged (see FIG. 13).

Subsequently, the CPU 101 executes a payout amount determination process (S86). In this process, whether three symbols of the same type are successively rearranged on a payline and a win is achieved is determined based on the payout table (see FIG. 7) which is stored in the RAM 103. In accordance with the type of win, a payout is awarded. The payout awarded is stored in a payout amount storage area which is provided in the RAM 103.

Subsequently, the CPU 101 executes a payout process (S87). The CPU 101 adds a value stored in the payout amount storage area of the RAM 103 to the value of the coin counter provided in the RAM 103.

Subsequently, the CPU 101 determines whether at least one "RED V" symbol or "BLUE V" symbol is rearranged in 9 areas of the symbol display area 21 (S88). When at least one "RED V" symbol or "BLUE V" symbol is rearranged (YES in S88), a point is awarded in accordance with the number of "RED V" symbols and the number of "BLUE V" symbols rearranged in at least one of the 9 areas of the symbol display area 21, and the awarded point is added to a point counter of the RAM 103 (S89). To be more specific, 5 points are awarded for each "RED V" symbol, whereas 1 point is awarded for each "BLUE V" symbol. For example, when one "RED V" symbol (5 points) and two "BLUE V" symbols (2 points) are rearranged in the symbol display area 21 as shown in FIG. 13, "5+2=7" points are awarded in total, and the awarded points are added to the point counter of the RAM 103. In this connection, the value of the point counter of the RAM 103 is displayed in a point display area 251 of the payout table display area 25 as shown in FIG. 13.

Meanwhile, when none of the "RED V" symbol and the "BLUE V" symbol is rearranged (NO in S88) or after S89, the CPU 101 determines whether the "UP" symbol is rearranged in at least one of the 9 areas of the symbol display area 21 (S90). When the "UP" symbol is rearranged (YES in S90), an FG point payout table update process is executed (S91). In this FG point payout table update process, each initial value is added to each payout amount associated with total points with reference to the FG point payout table update process shown in FIG. 8. For example, when the "UP" symbol is rearranged, if a payout amount associated with the total points "5 to 9" is "240" according to the current FG point payout table, the initial value "240" is added and hence the payout amount associated with the total points “5 to 9” is increased to “480”. If a payout amount associated with the total points “10 to 19” is “480”, the initial value “480” is added and hence the payout amount associated with the total points “10 to 19” is increased to “960”. If a payout amount associated with the total points “20 to 29” is “1200”, the initial value “1200” is added and hence the payout amount associated with the total points “20 to 29” is increased to “2400”. If a payout amount associated with the total points “30 to 39” is “2400”, the initial value “2400” is added and hence the payout amount associated with the total points “30 to 39” is increased to “4800”. If a payout amount associated with the total points “40 to 49” is “6000”, the initial value “6000” is added and hence the payout amount associated with the total points “40 to 49” is increased to “12000”. If a payout amount associated with the total points “50 or more” is “14400”, the initial value “14400” is added and hence the payout amount associated with the total points “50 or more” is increased to “28800”. In this way, the FG point payout table is updated (first update of the FG point payout table). In this connection, a payout amount corresponding to total points in the updated FG point payout table is updated as indicated by the frame 252 in FIG. 13.

In addition to the above, when the “UP” symbol is rearranged in the repeated execution of the free game (second update of the FG point payout table), if a payout amount associated with the total points “5 to 9” is “480” according to the current FG point payout table, the initial value “240” is added and hence the payout amount associated with the total points “5 to 9” is increased to “720”. If a payout amount associated with the total points “10 to 19” is “960”, the initial value “480” is added and hence the payout amount associated with the total points “10 to 19” is increased to “1440”. If a payout amount associated with the total points “20 to 29” is “2400”, the initial value “1200” is added and hence the payout amount associated with the total points “20 to 29” is increased to “3600”. If a payout amount associated with the total points “30 to 39” is “4800”, the initial value “2400” is added and hence the payout amount associated with the total points “30 to 39” is increased to “7200”. If a payout amount associated with the total points “40 to 49” is “12000”, the initial value “6000” is added and hence the payout amount associated with the total points “40 to 49” is increased to “18000”. If a payout amount associated with the total points “50 or more” is “28800”, the initial value “14400” is added and hence the payout amount associated with the total points “50 or more” is increased to “43200”. In this way, the FG point payout table is updated (second update of the FG point payout table). In this connection, a payout amount corresponding to total points in the updated FG point payout table is updated as indicated by the frame 253 in FIG. 14.

Similarly, when the “UP” symbol is rearranged in the further repeated execution of the free game (third update of the FG point payout table), the payout amount associated with the total points “5 to 9” is increased to “960”. The payout amount associated with the total points “10 to 19” is increased to “1920”. The payout amount associated with the total points “20 to 29” is increased to “4800”. The payout amount associated with the total points “30 to 39” is increased to “9600”. The payout amount associated with the total points “40 to 49” is increased to “24000”. The payout amount associated with the total points “50 or more” is increased to “57600”. In this way, the FG point payout table is updated (third update of the FG point payout table). In this connection, a payout amount corresponding to total points in the updated FG point payout table is updated as indicated by the frame 254 in FIG. 14.

Similarly, when the “UP” symbol is rearranged in the further repeated execution of the free game (fourth update of the FG point payout table), the payout amount associated with the total points “5 to 9” is increased to “1200”. The payout amount associated with the total points “10 to 19” is increased to “2400”. The payout amount associated with the total points “20 to 29” is increased to “6000”. The payout amount associated with the total points “30 to 39” is increased to “12000”. The payout amount associated with the total points “40 to 49” is increased to “30000”. The payout amount associated with the total points “50 or more” is increased to “72000”. In this way, the FG point payout table is updated (fourth update of the FG point payout table). In this connection, a payout amount corresponding to total points in the updated FG point payout table is updated as indicated by the frame 255 in FIG. 14.

As described above, in the present embodiment, the FG point payout table defines, as each initial value, a payout amount awarded in response to the total points which is the sum total of the points corresponding to the number of “RED V” symbols rearranged in the symbol display area 21 and the points corresponding to the number of “BLUE V” symbols rearranged in the symbol display area 21. While the free game is repeatedly executed eight times, each time the “UP” symbol is rearranged in the symbol display area 21, each initial value (see FIG. 8) is added to the payout amount associated with the total points defined in the FG point payout table. As such, a process of increasing the payout awarded in accordance with the total points each time the “UP” symbol is rearranged in the symbol display area 21 is realized only by adding each initial value to each payout amount which is currently set in the FG point payout table. This makes it possible to simplify a control program when various payout amounts are provided as a result of a slot game in which symbols to be rearranged in the symbol display area 21 are randomly determined and displayed.

Meanwhile, when no “UP” symbol is rearranged (NO in S90) or after S91, the CPU 101 subtracts 1 from the value of the FG counter of the RAM 103 (S92).

Subsequently, the CPU 101 determines whether the value of the FG counter of the RAM 103 is 0 (S93). When the value of the FG counter is not 0 (NO in S93), the routine goes back to S82.

Meanwhile, when the value of the FG counter is 0 (YES in S93), the CPU 101 executes a point payout awarding process (S94). In this point payout awarding process, a payout is awarded based on the value of the point counter in the RAM 103 and the FG point payout table (or the updated FG point payout table when the update has been done in S91).

For example, when, as shown in FIG. 14, the value of the point counter displayed in the point display area 251 is “21” and the updated FG point payout table defines that the payout amount associated with the total points “5 to 9” is “1200”, the payout amount associated with the total points “10 to 19” is “2400”, the payout amount associated with the total points “20 to 29” is “6000”, the payout amount associated with the total points “30 to 39” is “12000”, the payout amount associated with the total points “40 to 49” is “30000”, and the payout amount associated with the total points “50 or more” is “72000”, “6000” coins are awarded as the payout amount associated with the total points “21”.

After S94, this process is terminated.

As described above, while the free game is repeatedly executed eight times, a payout amount awarded in response to the total points which is the sum total of the points corresponding to the number of "RED V" symbols rearranged in the symbol display area 21 and the points corresponding to the number of "BLUE V" symbols rearranged in the symbol display area 21 increases each time the "UP" symbol is rearranged in the symbol display area 21. As such, a payout amount which may be awarded is increased little by little, and hence various payout amounts are available. On this account, when various payout amounts are provided as a result of a slot game in which symbols to be rearranged in the symbol display area 21 are randomly determined and displayed, it is unnecessary to prepare various combinations of symbols corresponding to various payout amounts and adjust the probabilities of establishment of these combinations of symbols, with the result that the control program can be easily constructed.

(Server Backup Process)

Figure 11:
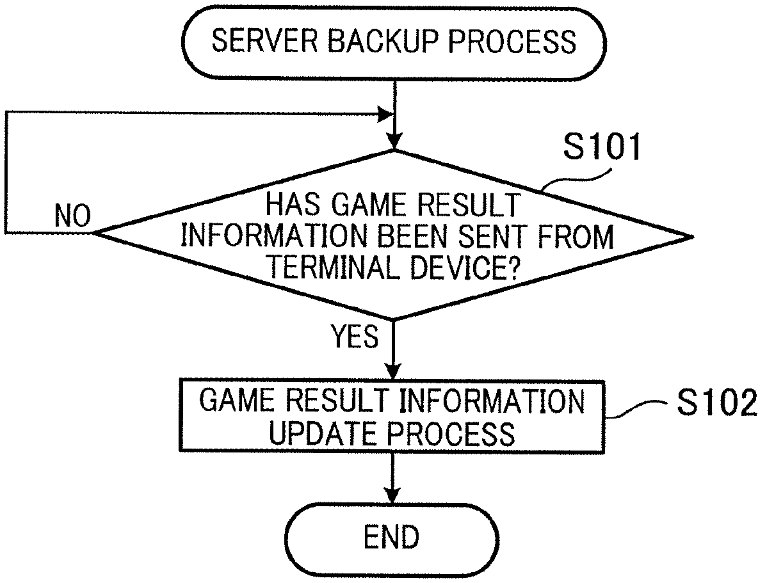
FIG. 11 shows a flowchart of a server backup process.

The following will describe a server backup process with reference to FIG. 11.

The control unit 131 of the server 100 determines whether game result information has been received from the smartphone 1 (terminal device) (S101). When the game result information has not been received (NO in S101), the sending of the information is waited for.

Meanwhile, when the game result information has been received (YES in S101), the control unit 131 executes a game result information update process (S102). In this game result information update process, the user is specified based on the identification number of the smartphone 1 which has sent the game result information, and the game result information of each user is stored in the storage unit 132. This makes it possible to store results of each execution of a slot game on each smartphone 1, such as the number of betted coins, selected to-be-stopped symbols, and an awarded payout, in the storage unit 132 as the game result information of each user. Then, this process is terminated.

OTHER EMBODIMENTS

In the embodiment above, while the free game is repeatedly executed eight times, a payout amount awarded in response to the total points which is the sum total of the points corresponding to the number of "RED V" symbols rearranged in the symbol display area 21 and the points corresponding to the number of "BLUE V" symbols rearranged in the symbol display area 21 increases by the initial value, each time the "UP" symbol is rearranged in the symbol display area 21. Alternatively, a predetermined value which is different from the initial value may be added to a payout awarded in accordance with total points, or a payout awarded in accordance with total points may be multiplied by a predetermined number.

The slot game in the embodiment above may be, as game software (a program and game data), installed in and executed by an information processor. Examples of the information processor include mobile information devices such as a smartphone, a portable computer, a laptop computer, a note PC, a tablet PC, a handheld PC, and a PDA (Personal Data Assistant). The game software by which the slot game is executed is downloaded from a server or the like via communication means and stored in a storage device (e.g., a flash memory) in the mobile information device. The communication means may be an interactive communication passage such as the Internet and a cable TV, or may be one-way broadcasting.

The game software by which the slot game is executed may be stored in a recording medium such as a CD-ROM, a DVD-ROM, an MO (optical magnetic disc), a hard disk, and a flash memory, and may be read from the recording medium and installed in a storage device of a information processor such as the server 100 and the smartphone 1, according to need.

The disclosure of the embodiment above may be embodied as a game program which is executed between each smartphone 1 and the server 100 over the Internet (communication line). In this case, the game program may be stored in a recording medium such as a CD-ROM, a DVD-ROM, an MO (optical magnetic disc), a hard disk, and a flash memory, and may be read from the recording medium according to need.

The processes executed in the embodiment above may be a game program installed in the smartphone 1 (terminal device). The game program may be stored in a recording medium (medium).

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

What is claimed is:

1. An information processor which is capable of executing a game in which symbol random determination is performed to select symbols to be rearranged and a payout is awarded in accordance with an arrangement pattern of the selected symbols, the information processor comprising:

a storage device configured to store a payout table in which the number of first symbols is associated with a payout amount; and a controller programmed to execute the processes of:

(a) when a first symbol is included in the arrangement pattern of the symbols selected by the symbol random determination while the game is repeated a predetermined number of times, cumulating the number of the first symbols;

(b) each time a second symbol is included in the arrangement pattern of the symbols selected by the symbol random determination while the game is repeated the predetermined number of times, increasing the payout amount associated with the number of the first symbols in the payout table; and (c) awarding a payout calculated based on the number of the first symbols cumulated in the process (a) and the payout table in which the payout amount associated with the number of the first symbols is increased in the process (b).

2. The information processor according to claim 1, wherein, the payout table stores, as an initial value, the payout amount associated with the number of the first symbols, and in the process (b), each time it is determined that a second symbol is included in the arrangement pattern of the symbols selected by the symbol random determination, the payout amount associated with the number of the first symbols in the payout table is increased by adding the initial value to the payout amount.

3. A non-transitory computer-readable medium that stores a game program to be run on an information processor which is capable of executing a game in which symbol random determination is performed to select symbols to be rearranged and a payout is awarded in accordance with an arrangement pattern of the selected symbols, when the game is executed, the game program causes the information processor to execute the processes of:

(a) when a first symbol is included in the arrangement pattern of the symbols selected by the symbol random determination while the game is repeated a predetermined number of times, cumulating the number of the first symbols;

(b) each time a second symbol is included in the arrangement pattern of the symbols selected by the symbol random determination while the game is repeated the predetermined number of times, increasing a payout amount associated with the number of the first symbols in a payout table in which the number of the first symbols is associated with a payout amount; and (c) awarding a payout calculated based on the number of the first symbols cumulated in the process (a) and the payout table in which the payout amount associated with the number of the first symbols is increased in the process (b).

4. An information processor which is capable of executing a game in which symbol random determination is performed to select symbols to be rearranged and a payout is awarded in accordance with an arrangement pattern of the selected symbols, the information processor comprising:

a storage device configured to store a payout table in which the number of first symbols is associated with a payout amount; and a controller programmed to execute the processes of:

(a) when a first symbol is included in the arrangement pattern of the symbols selected by the symbol random determination while the game is repeated a predetermined number of times, cumulating the number of the first symbols;

(b) each time a second symbol is included in the arrangement pattern of the symbols selected by the symbol random determination while the game is repeated the predetermined number of times, increasing the payout amount associated with the number of the first symbols in the payout table; and (c) awarding a payout calculated based on the number of the first symbols cumulated in the process (a) and the payout table in which the payout amount associated with the number of the first symbols is increased in the process (b).

5. The information processor according to claim 1, wherein, in the process (b), each time it is determined that the second symbol is included in the arrangement pattern of the symbols selected by the symbol random determination, the payout amount associated with the number of the first symbols in the payout table is increased by adding a predetermined value to the payout amount.

6. The information processor according to claim 1, wherein, in the process (b), each time it is determined that the second symbol is included in the arrangement pattern of the symbols selected by the symbol random determination, the payout amount associated with the number of the first symbols in the payout table is increased by multiplying the payout amount by a predetermined value.

7. A non-volatile recording medium storing a game program, the game program being run on an information processor which executes a game in which symbol random determination is performed to select symbols to be rearranged and a payout is awarded in accordance with an arrangement pattern of the selected symbols, when the game is executed, the game program causing the information processor to execute the processes of:

(a) when a first symbol is included in the arrangement pattern of the symbols selected by the symbol random determination while the game is repeated a predetermined number of times, cumulating the number of the first symbols;

(b) each time a second symbol is included in the arrangement pattern of the symbols selected by the symbol random determination while the game is repeated the predetermined number of times, increasing a payout amount associated with the number of the first symbols in a payout table in which the number of the first symbols is associated with a payout amount; and (c) awarding a payout calculated based on the number of the first symbols cumulated in the process (a) and the payout table in which the payout amount associated with the number of the first symbols is increased in the process (b).

8. The information processor according to claim 1, wherein the controller is programmed to further execute processes of:

(d) when a third symbol is included in the arrangement pattern of the symbols selected by the symbol random determination while the game is repeated a predetermined number of times, cumulating the number of the third symbols; and (e) determining a total point based on the number of the first symbols and the number of the third symbols, wherein in the payout table, the total point determined based on the number of the first symbols and the number of the third symbols is associated with the payout amount, wherein in the process (b), each time the second symbol is included in the arrangement pattern of the symbols selected by the symbol random determination while the game is repeated the predetermined number of times, the payout amount associated with the total point is increased in the payout table in which the total point is associated with a payout amount, and wherein in the process (c), the payout is calculated based on the total point in the process (e) and the payout table in which the payout amount associated with the total point is increased in the process (b).

9. The information processor according to claim 8, wherein in the process (e), the total point is determined by adding a product between the number of the first symbols and a first point allocated to the first symbol and a product between the number of the third symbols and a second point allocated to the third symbol.

10. The information processor according to claim 9, wherein the second point is less than the first point.

11. The information processor according to claim 1, wherein the symbol random determination rearranges all of symbols to be displayed on a symbol display area of the information processor.

* * * * *